United States Patent
Reboulet

Patent Number: 6,026,701
Date of Patent: Feb. 22, 2000

[54] "MASTER-SLAVE" REMOTE MANIPULATION APPARATUS HAVING SIX DEGREES OF FREEDOM

[75] Inventor: Claude Reboulet, Labege, France

[73] Assignee: Onera (Office National d'Etudes et de Recherches Aerospatiales, Chatillon, France

[21] Appl. No.: 09/068,953

[22] PCT Filed: Nov. 21, 1996

[86] PCT No.: PCT/FR96/01849

§ 371 Date: Dec. 14, 1998

§ 102(e) Date: Dec. 14, 1998

[87] PCT Pub. No.: WO97/18927

PCT Pub. Date: May 29, 1997

[30] Foreign Application Priority Data

Nov. 21, 1995 [FR] France ................................. 95 13791

[51] Int. Cl.[7] ........................................................ B25J 3/02
[52] U.S. Cl. ........................... 74/471 XY; 74/490.04; 74/501.6; 33/25.1; 414/7; 414/917; 901/21; 359/477
[58] Field of Search ...................... 33/25.1, 25.2, 33/25.3; 74/471 XY, 490.04, 500.5, 501.6; 414/7, 917; 901/21; 359/477

[56] References Cited

U.S. PATENT DOCUMENTS

| | | |
|---|---|---|
| 2,774,488 | 12/1956 | Goertz et al. |
| 3,369,427 | 2/1968 | Brighton et al. ....................... 74/502.1 |
| 3,966,162 | 6/1976 | Hadley ........................... 74/471 XY X |
| 4,393,728 | 7/1983 | Larson et al. .................... 74/479.01 X |
| 4,826,087 | 5/1989 | Chinery .......................... 74/471 XY X |
| 5,397,304 | 3/1995 | Truckai ..................................... 604/95 |

FOREIGN PATENT DOCUMENTS

| | | |
|---|---|---|
| 0 595 291 A1 | 5/1994 | European Pat. Off. |
| 2 672 836 | 8/1992 | France. |
| WO 94/26167 | 11/1994 | WIPO. |

*Primary Examiner*—Allan D. Herrmann
*Attorney, Agent, or Firm*—Larson & Taylor

[57] ABSTRACT

A "master-slave" remote manipulation apparatus having six degrees of freedom. The apparatus includes a flexible parallelogram with two parallel arms hinged to a cross member with one degree of rotational freedom and to a frame with two degrees of rotational freedom; two parallel-hinged "master" and "slave" devices at the end of each respective arm; and five two-way linear motion transmitting devices between the "master" and "slave" devices.

11 Claims, 3 Drawing Sheets

"MASTER-SLAVE" REMOTE MANIPULATION APPARATUS HAVING SIX DEGREES OF FREEDOM

BACKGROUND OF THE INVENTION

The present invention relates to improvements made to remote manipulation apparatuses of the "master-slave" type which are intended to allow the remote manipulation of any object by a direct mechanical transmission.

An apparatus of this kind allows an operator, actuating a "master" device lying in a control space, to manipulate objects using the "slave" device lying in a distance and inaccessible work space. This apparatus may be arranged in such a way that it modifies the amplitude of the movements made by the operator, for example to reduce it, this then making it possible to operate in a small work space homothetic with the control space.

The known remote manipulation apparatuses are generally made from articulated mechanical structures of the "series" type: they therefore have their drawbacks of heaviness and bulkiness.

BRIEF SUMMARY OF THE INVENTION

The object of the present invention is essentially to propose an improved remote manipulation apparatus which enjoys the advantages of an appreciable reduction in weight and of bulk as exhibited by articulated structures of the parallel type, and more particularly by those described in document FR-A-2 672 836 in the name of the Applicant. Furthermore and above all, the object of the invention is to allow the numerous types of mobility of the articulations disclosed in the aforementioned document to be put to good use in order to achieve remote manipulation devices with six degrees of freedom which offer optimum flexibility for use.

To this end, a remote manipulation apparatus of the "master-slave" type with six degrees of freedom, three in rotation and three in translation, designed in accordance with the invention, is essentially characterized in that it comprises:

an articulated structure in the form of a deformable parallelogram, comprising two parallel arms each joined, on the one hand, to a crossmember by an articulation with one degree of freedom in rotation about an axis perpendicular to the plane of the parallelogram and, on the other hand, to a structure by an articulation with two degrees of freedom in rotation about two axes, the first axis being perpendicular to the plane of the parallelogram and the second axis being supported by the fourth side of the parallelogram, the four articulations lying at the vertices of the parallelogram, the two arms extending beyond their respective articulation to the structure;

two articulation devices with parallel structure, namely a "master" device and a "slave" device, these devices being arranged respectively at the free end of each arm, each device comprising:

a base supported by the free end of the corresponding arm, a member which can move relative to the base, forming either the control member in the "master" device, or the controlled member in the "slave" device, the moving member being articulated at its center, with three degrees of freedom in rotation, to a support mounted on the base with the possibility of axial displacement parallel to the axis of the arm, by virtue of which arrangement the moving member has a degree of freedom in axial translation relative to said arm, four actuator devices approximately parallel to the axis of the arm, inserted between the base and the moving member and surrounding the support, each actuator device comprising a linkage approximately parallel to the axis of the arm and supported by the base so as to be capable of sliding therein parallel to the axis of the arm, and a connecting piece of fixed length connected with articulations in rotation to the end of the linkage and to the moving member, the respective positions of the linkages on the base and of the articulations of the connecting pieces on the moving element being such that the connecting pieces are capable of creating moments about three axes of rotation on the moving member, giving it three degrees of freedom in rotation with respect to the corresponding arm, and five devices for the two-way transmission of linear movement which are inserted in the case of four of them, between the four actuator devices of the "master" device and the four corresponding actuator devices of the "slave" device, and, in the case of the fifth one, between the respective supports of the moving control member of the "master" device and of the moving controlled member of the "slave" device, these two-way transmission devices being arranged in such a way that the linear displacement of one actuator device or of the support of the moving control member of the "master" device is transmitted in the form of a linear displacement in the same sense of the corresponding actuator device or of the support of the moving controlled member of the "slave" device.

An articulation device for the parallel structure like the aforementioned one is already known from the document cited earlier—FR-A-2 672 836 (see claim 5 and FIG. 1 of said document), while the design of a "master-slave" apparatus using two such articulation devices is also mentioned (claim 12 and FIG. 10) without practical embodiments actually having been put forward. The abovementioned provisions for an apparatus in accordance with the invention characterize a novel technical solution and form the basis of a functionally effective apparatus which has six degrees of freedom.

It may also be noted that the device of the invention combines a mechanical structure with two degrees of freedom, forming a tool support, in the form of a parallelogram, and two hand grips of parallel structure derived from the structure described in the document FR 2 672 836. The improvement made to the hand grip consists in employing an actuator dealing exclusively with the degree of freedom in translation, which leads to a master-slave structure with four degrees of freedom and redundancy of means in rotation. A device of this kind offers capabilities for displacement which cannot be obtained using devices of the prior art.

Advantageously, each movement transmission device comprises a flexible transmitter member designed to transmit both pulling forces and thrusting forces, each transmission device comprising a flexible cable enclosed, with the possibility of free longitudinal sliding, in a sheath, each end of which is anchored to the base of an arm; an inverter device designed so that the two ends of the transmitter member, which ends are directed parallel to the axis of the arms, on the bases, will have displacements in the same sense is functionally associated with each movement transmission device thus constructed. Use of the technical solution just proposed makes it possible to establish a flexible and wire-like link between the "master" device and the "slave" device, which leads to an apparatus which is simple to produce and has a small bulk, which relies upon crude but effective and therefore inexpensive members. In particular, it is thus possible to produce the two arms in the form of tubes, these arms containing the respective ends of the aforementioned two-way transmission devices.

Furthermore, it is possible, and advantageous in certain applications, for the two arms of the articulated structure in the form of a deformable parallelogram to have, beyond their articulation with the structure, different lengths, the amplitude of the displacement transmitted by the two-way transmission device inserted between the respective supports of the moving control and controlled members being modified in the same ratio as the ratio of the lengths of the two arms; thanks to this arrangement the extent of the field of operation of the remote manipulation apparatus is transformed in the ratio of the lengths of the arms; in this case it is possible, in particular, to contrive for the length of the arm of the "slave" articulation device to be shorter than the length of the arm of the "master" articulation device, thanks to which arrangement the movements of the "master" articulation device are demultiplied with a reduction ratio that is equal to the ratio of the lengths of the arms with respect to the corresponding movements performed, under its control, by the "slave" articulation device; it is then desirable for the remote manipulation apparatus additionally to comprise, associated with the "slave" articulation device, a viewing device, especially a stereoscopic viewing device, arranged in such a way that it provides an image of the field of operation of the "slave" articulation device with a magnification that is the inverse of the aforementioned reduction ratio, so as to form a complete apparatus which is very easy for the operator to use.

It may be noted at this point that the apparatus of the invention has a wire-like structure which lends itself well to use in the field of surgery or in any field which requires intervention in a restricted work space, such as microelectronics for example. However, the benefit of the apparatus of the invention is not simply restricted to these applications but covers all the conventional fields of remote manipulation.

It will also be noted that with the exception of the accessory special-purpose sensors which are associated with the anticipated application of the apparatus (generally a camera), the apparatus of the invention, by feeding back forces both in terms of pulling and in terms of compression and rotation, requires no sensors, no electronics and therefore no computer systems to control it. A direct consequence of this novel feature is of course that it appreciably reduces the cost of manufacture.

BRIEF DESCRIPTION OF THE DRAWINGS

The invention will be better understood from reading the detailed description which follows of a number of preferred embodiments which are given merely by way of nonlimiting examples. In this description, reference is made to the appended drawings in which.

DETAILED DESCRIPTION OF THE INVENTION

Figure 1:
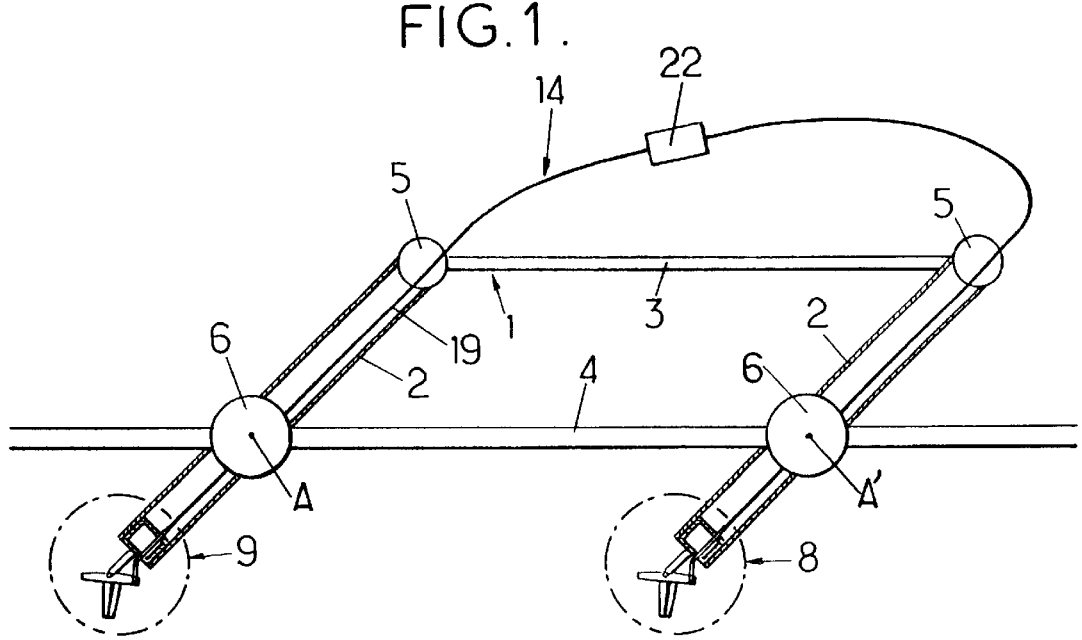
FIG. 1 is a highly diagrammatic view of a remote manipulation apparatus of the "master-slave" type arranged in accordance with the invention.

Depicted overall and diagrammatically in FIG. 1 is a remote manipulation apparatus of the "master-slave" type arranged in accordance with the invention.

It comprises an articulated structure 1 in the form of a deformable parallelogram, comprising two parallel arms 2, a crossmember 3 and a structure 4. The crossmember 3 is connected, with free rotation, by articulations 5 with one degree of freedom, to the ends of the arms 2; the structure 4 is connected with free rotation, by articulations 6 with two degrees of freedom, to intermediate points A and A' respectively on the arms 2; the arms 2 thus extend beyond the articulations 6.

Figure 3:
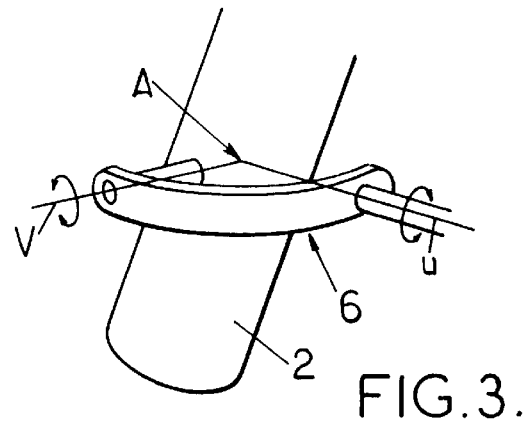
FIGS. 3 and 4 are views, on a larger scale, of each of two alternative embodiments of articulations of the apparatus of FIG. 1.

The articulations 6 have the two necessary degrees of rotation about two coplanar and mutually perpendicular axes at the points A and A' respectively. FIG. 3 shows a first possible arrangement, of the Cardan type, in which the arm 2 can pivot about the axis $v$, and the arm 2 and the axis $v$ can pivot about the axis $u$ supported by the fourth side AA' of the parallelogram; the axis $u$ may be a shaft pivoting at its end on the fixed structure 4.

Figure 4:
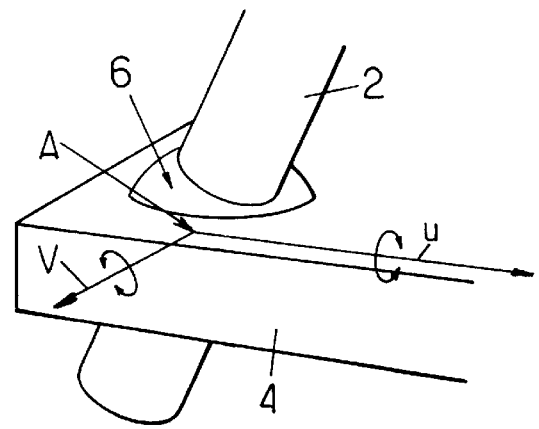

Use may also be made of a spherical articulation 6, supported by the structure 4, as shown in FIG. 4.

Figure 5:
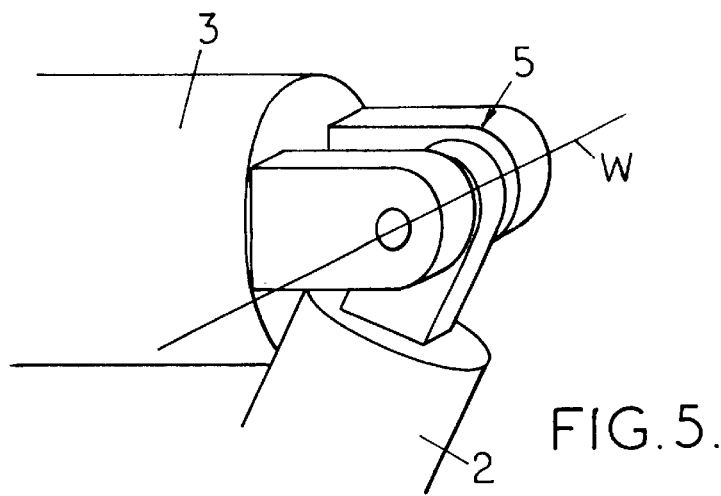
FIG. 5 is a view, on a larger scale, of other articulations of the apparatus of FIG. 1.

The two articulations 5 may be arranged as depicted in FIG. 5, to provide just one degree of freedom in rotation about an axis $w$. Of course, the axes $w$ of the articulations 5 and the axes $v$ of the articulations 6 are mutually parallel and are perpendicular to the plane of the parallelogram.

Figure 2:
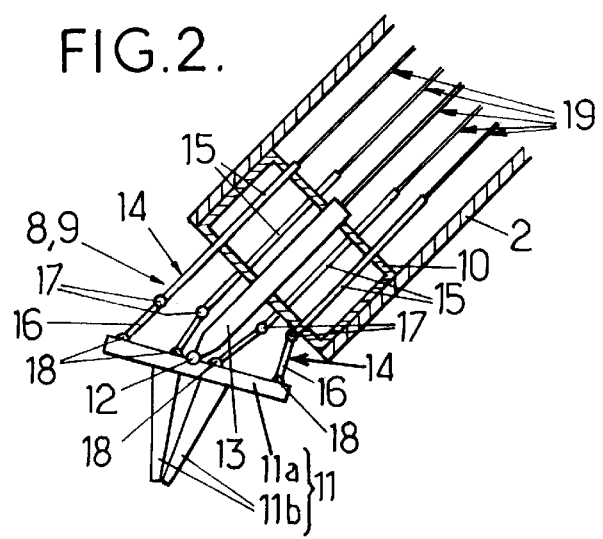
FIG. 2 is a view, on a larger scale and in greater detail, of the end of one of the arms of the apparatus of FIG. 1.
Figure 9:
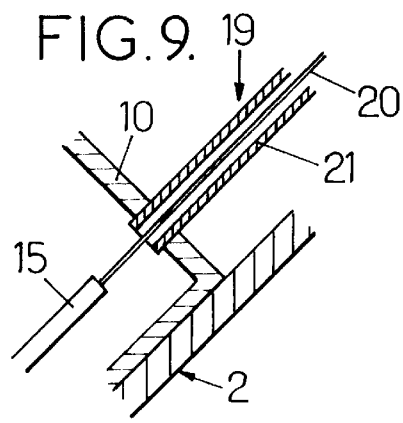
FIG. 9 shows an enlargement of FIG. 2.

Placed respectively at the respective free ends of the two arms 2 are two articulation devices with parallel structure—a "master" device 8, and a "slave" device 9. The two devices—the "master" device 8 and the "slave" device 9—are constructed identically and are arranged, in a way known per se, in accordance with the teachings of document FR-A-2 672 836 to correspond to the embodiment of FIG. 10 and claim 5. This being the case, each device 8, 9 comprises, as can be seen more particularly in FIG. 2, the following elements:

A base 10 which consists of the free end of the arm 2; this may, as shown in FIG. 2, be an end fitting attached and fixed to or into the end of the arm 2.

A member 11 (comprised of a plate 11a and protrusions 11b) that can move relative to the base 10, constituting the actual control member of the "master" device 8 and the controlled member (especially tool-holding gripper) of the "slave" device 9. This moving member 11 is supported centrally, with an articulation 12 that has three degrees of freedom in rotation, on a support 13 mounted on the base 10 with the possibility of axial displacement relative to said arm. In this instance the support 13 consists of a rod approximately coaxial with the arm 2 and sliding axially with respect thereto. In the instance depicted, the base 10 supports the rod 13 so that it is free to slide. It will be noted that it would have been possible also for the support 13 to have been secured to the base 10, which would have been mounted so that it could slide on or in the arm 2. Thanks to this arrangement, the moving member 11 has a degree of freedom in axial translation.

Four actuator devices 14 approximately parallel to the axis of the arm, inserted between the free end of the arm and the moving member 11. These four actuator devices 14 are distributed around the support 13 (only two actuators have been depicted in FIG. 2). Each actuator device 14 comprises:

a linkage 15 approximately parallel to the axis of the arm 2 and supported by the base 10 in which it slides freely, and a connecting piece 16 of fixed length connected with articulations in rotation to the end of the linkage 15 and to the moving member 11, the respective positions of the linkages 15 on the base 10 and of the articulations of the connecting pieces 16 on the moving member 11 being such that the connecting pieces 16 are capable of creating moments about three axes of rotation on the moving member 11, giving it three degrees of freedom in rotation relative to the arm 2.

It will be noted at this point that the connections 17 between the connecting pieces 16 and the respective linkages 15 are connections which are articulated in space, such as balljoints or Cardan joints, and that the connections 18 between the connecting pieces 16 and the moving member 11 are connections which are articulated in space such as balljoints.

And finally, five devices 19 for the two-way transmission of linear movement (that is to say devices capable of transmitting a linear movement selectively in the two possible senses in a given direction) which are inserted in the case of four of them, between the four actuator devices 14 of the "master" device 8 and the corresponding four actuator devices 14 of the "slave" device 9, and, in the case of the fifth, between the respective supports 13 of the moving control member of the "master" device 8 and of the moving controlled member of the "slave" device 9.

An economical and simple way of producing the force-transmission devices consists in using a connection using piano wire or a similar cable 20 (see FIGS. 6 and 7) contained in a flexible sheath 21 anchored at its ends and which is capable of transmitting forces in both directions. Recourse could, of course, be had to other known means, such as controls with balls.

In order to maintain the sense of the transmission of the displacement from the moving control member to the moving controlled member, an inverter device 22, arranged in such a way that the two ends of the transmitter member, in this case the cable 20, have displacements in the same sense at the respective ends of the arms 2, is associated with each transmission device 19.

Figure 6:
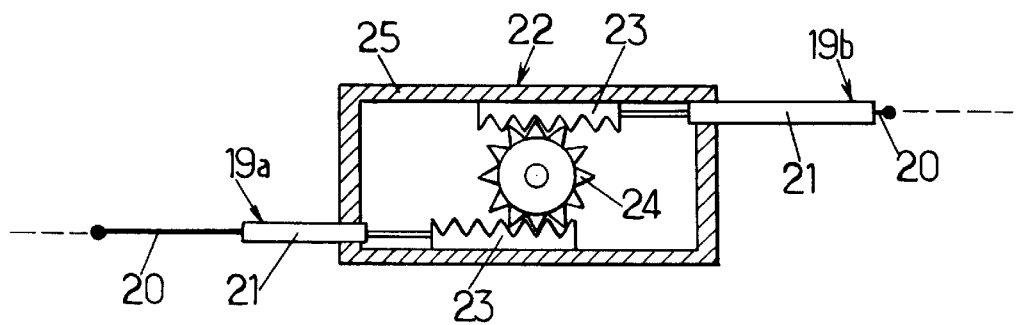
FIGS. 6 and 7 are views, on a larger scale and in greater detail, of each of two alternative embodiments of an inverter device of the apparatus of FIG. 1.

The inverter device 22 may be produced as shown in FIG. 6. The transmission device 19 is split into two parts 19$\underline{a}$ and 19$\underline{b}$ arranged more or less end to end; the ends of the half cables 20 are connected to or shaped in the form of respective racks 23 arranged face to face and meshing with an inserted cog wheel 24 mounted to rotate freely on the casing 25 of the device.

Figure 7:
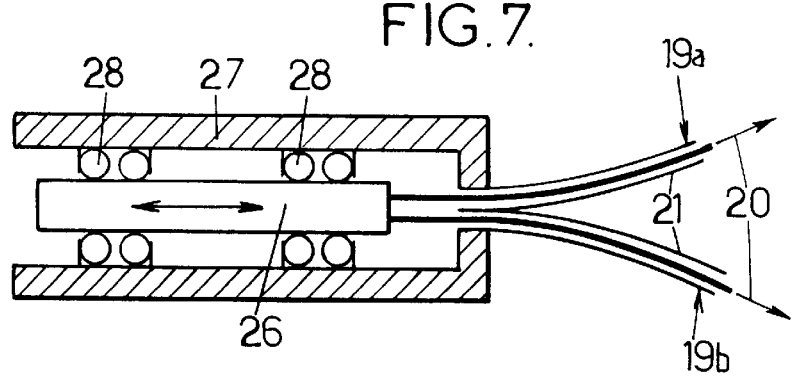

The inverter device can also be constructed as shown in FIG. 7. The two parts 19$\underline{a}$ and 19$\underline{b}$ of the transmission device 19 are joined together side by side, as a bundle, and are secured by any known means, by soldering or alternatively, as depicted, by being crimped into a sleeve 26, which is installed with free axial sliding in a guide bushing consisting of a casing 27 and, preferably, with the insertion of ball guides 28.

It will be noted that the arms 2 may advantageously be produced in the form of tubes, not only so that they will be non-deformable for a minimum weight, but also to serve as a guide for the five transmission devices 19, in the end regions thereof.

Figure 8:
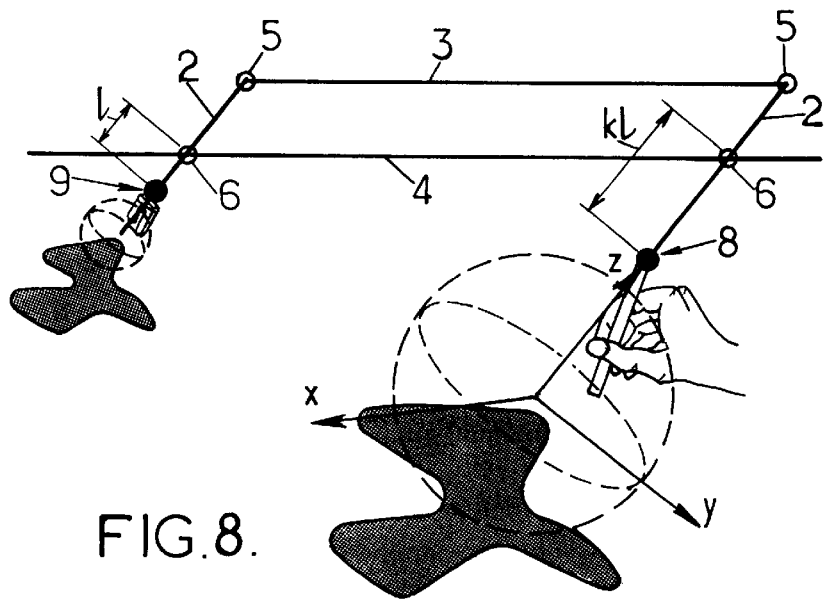
FIG. 8 is a highly diagrammatic view of an alternative form of the apparatus of FIG. 1.

Furthermore, it will also be noted that the remote manipulation device depicted in FIG. 1 with arms 2 of the same length gives the control member and the controlled member the same amplitudes of operation. It is envisageable for the two arms 2 to be given different lengths (this referring to the length of each arm between its articulation 6 and its free end) and for use to be made of an inverter device 22 in which the displacement-transmission ratio is other than unity, in the transmission device inserted between the supports 13 of the moving members 11 of each arm 2; this then gives different amplitudes of linear displacement for the control member and the controlled member, the angles of rotation being kept the same. In particular, as shown in FIG. 8, the arm 2 of the "master" device 8 may have a length $\underline{k}$ times greater than that of the arm 2 of the "slave" device 9: the linear displacements of the control member of the "master" device 8 are then transmitted to the controlled member of the "slave" device 9 with a demultiplication by a ratio $\underline{k}$. Depending on the envisaged application, this remote manipulation device could be coupled to a viewing device, especially a stereoscopic viewing device which reproduces, within the operator's eyepiece, a three-dimensional virtual image, enlarged in the homothetic ratio $\underline{k}$ so that the operator has the feeling that he is working directly on this virtual image. Furthermore, combining two complete remote manipulation devices may allow an operator to work with both hands.

As goes without saying and as is already obvious from the foregoing, the invention is not in any way restricted to those of its applications and embodiments which have been more specifically envisaged; to the contrary, it encompasses all alternative forms thereof.

I claim:

1. Remote manipulation apparatus of the "master-slave" type with six degrees of freedom, characterized in that it comprises:

an articulated structure (1) in the form of a deformable parallelogram, comprising two parallel arms (2) each joined, on the one hand, to a crossmember (3) by an articulation (5) with one degree of freedom in rotation about an axis perpendicular to the plane of the parallelogram and, on the other hand, to a structure (4) by an articulation (6) with two degrees of freedom in rotation about two axes, the first axis being perpendicular to the plane of the parallelogram and the second axis being supported by the fourth side of the parallelogram, the four articulations lying at the vertices of the parallelogram, the two arms (2) extending beyond their respective articulations (6) to the structure;

two articulation devices (8, 9) with parallel structure, namely a "master" device and a "slave" device, these devices being arranged respectively at the free end of each arm (2), each device comprising:

a base (10) supported by the free end of the corresponding arm (2), a member (11) which can move relative to the base (10), forming either the control member in the "master" device, or the controlled member in the "slave" device, said moving member (11) being articulated (12) at its center, with three degrees of freedom in rotation, to a support (13) mounted on the base (10) for axial displacement parallel to the axis of the arm, by virtue of which arrangement the moving member has a degree of freedom in axial translation relative to said arm, four actuator devices (14) approximately parallel to the axis of the arm, inserted between the base (10) and the moving member (11) and surrounding the support (13), each actuator device comprising
a linkage (15) approximately parallel to the axis of the arm, supported by the base 10 and capable of sliding freely therein parallel to the axis of the arm,
and a connecting piece (16) of fixed length connected with articulations in rotation to the end of the linkage (15) and to the moving member (11), the respective positions of the linkages (15) on the base (10) and of the articulations of the connecting pieces (16) on the moving member (11) being such that the connecting pieces (16) are capable of creating moments about three axes of rotation on the moving member, giving it three degrees of freedom in rotation with respect to the corresponding arm (2), and five devices (19) for the two-way transmission of linear movement which are inserted
in the case of four of them, between the four actuator devices of the "master" device (8) and the four corresponding actuator devices of the "slave" device (9),
and, in the case of the fifth one, between the respective supports of the moving control member of the "master" device (8) and of the moving controlled member of the "slave" device (9),
these two-way transmission devices being arranged in such a way that the linear displacement of one actuator device or of the support of the moving control member of the "master" device is transmitted in the form of a linear displacement in the same sense of the corresponding actuator device or of the support of the moving controlled member of the "slave" device.

2. Remote manipulation apparatus according to claim 1, characterized in that the articulation (6) with two degrees of freedom is of the Cardan type.

3. Remote manipulation apparatus according to claim 1, characterized in that the articulation (6) with two degrees of freedom is of the balljoint type.

4. Remote manipulation apparatus according to claim 1, characterized in that each two-way transmission device (19) comprises a flexible transmitter member designed to transmit both pulling forces and thrusting forces.

5. Remote manipulation apparatus according to claim 4, characterized in that each two way transmission device is of the type comprising a flexible cable (20) enclosed for free longitudinal sliding in a sheath (21), each end of which is anchored to the base of an arm (2).

6. Remote manipulation apparatus according to claim 4, characterized in that an inverter device (22) designed so that the two ends of the flexible transmitter member, which ends are directed parallel to the axis of the arms, on the bases, will have displacements in the same sense is functionally associated with each movement transmission device (19).

7. Remote manipulation apparatus according to claim 6, characterized in that the flexible transmitter member (19) consists of two half members (19a, 19b) end to end and in that the inverter device (22) is of the rack type, the joined-together ends of the half members being arranged in the form of respective racks (23) placed face to face and meshing with a cog wheel (24) which is mounted so that it is free to rotate.

8. Remote manipulation apparatus according to claim 6, characterized in that the flexible transmitter member (19) consists of two half members (19a, 19b), the two ends of which are joined together as a bundle and in that the inverter device (22) is of the "bushing" type, the two ends, joined together as a bundle, being engaged with free axial sliding in a guide bushing (27).

9. Remote manipulation apparatus according to claim 8, characterized in that the device is of the "ball bushing" type (27, 28).

10. Remote manipulation apparatus according to claim 1, characterized in that the two arms (2) are produced in the form of tubes and contain the respective end parts of the aforementioned two-way transmission devices (19).

11. Remote manipulation apparatus according to claim 1, characterized in that the two arms (2) of the articulated structure in the form of a deformable parallelogram have, beyond their articulation (6) to the pivoting crossmember (4), different lengths, and in that the amplitude of the displacement transmitted by the two-way transmission device inserted between the supports (13) of the moving members (11) is modified in the same ratio as the ratio of the lengths of the two arms, by virtue of which arrangement the remote manipulation apparatus is transformed in the ratio of the lengths of the arms and maintains the angles of rotation.

* * * * *